United States Patent Office 3,463,444
Patented Aug. 26, 1969

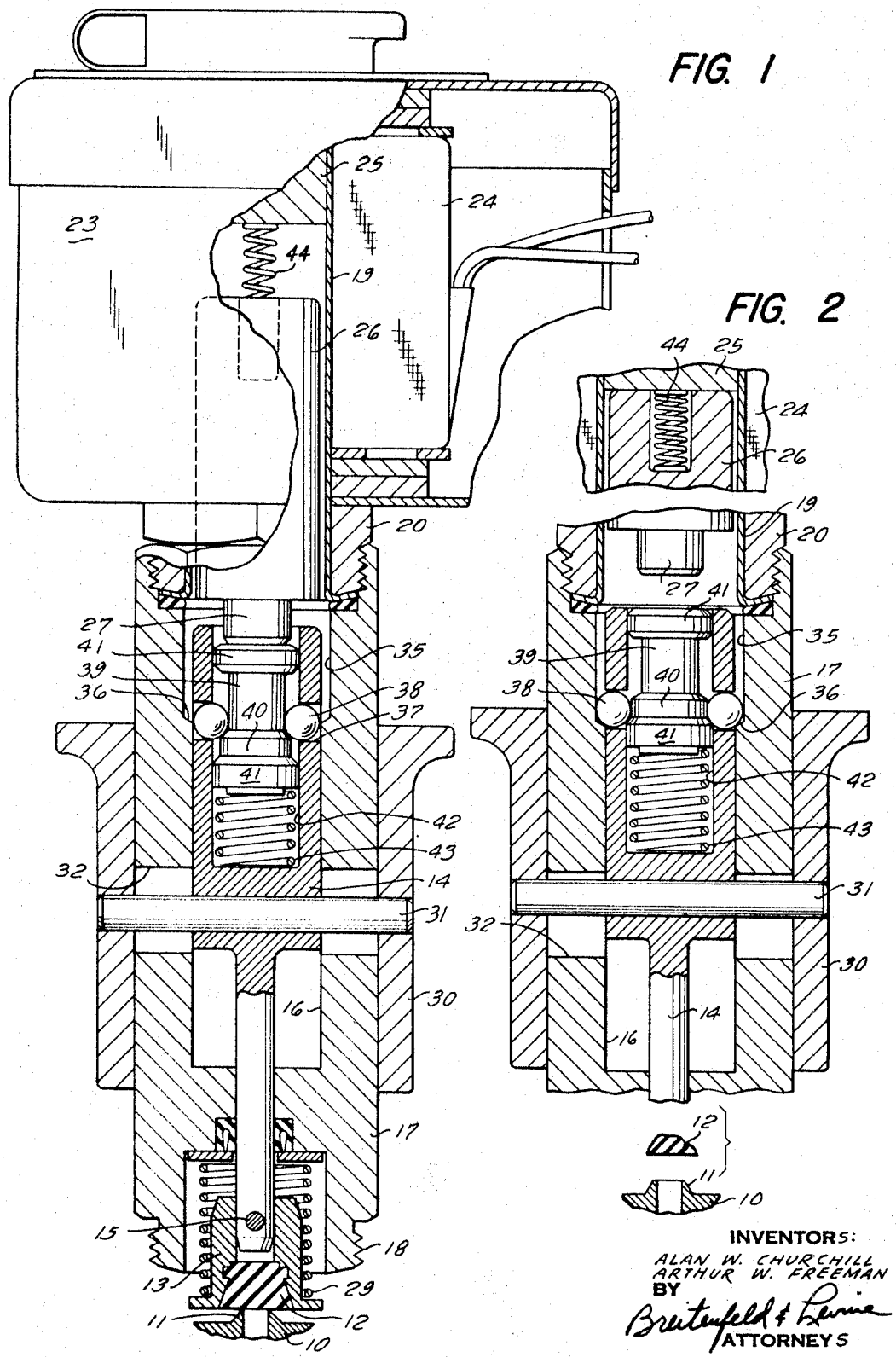

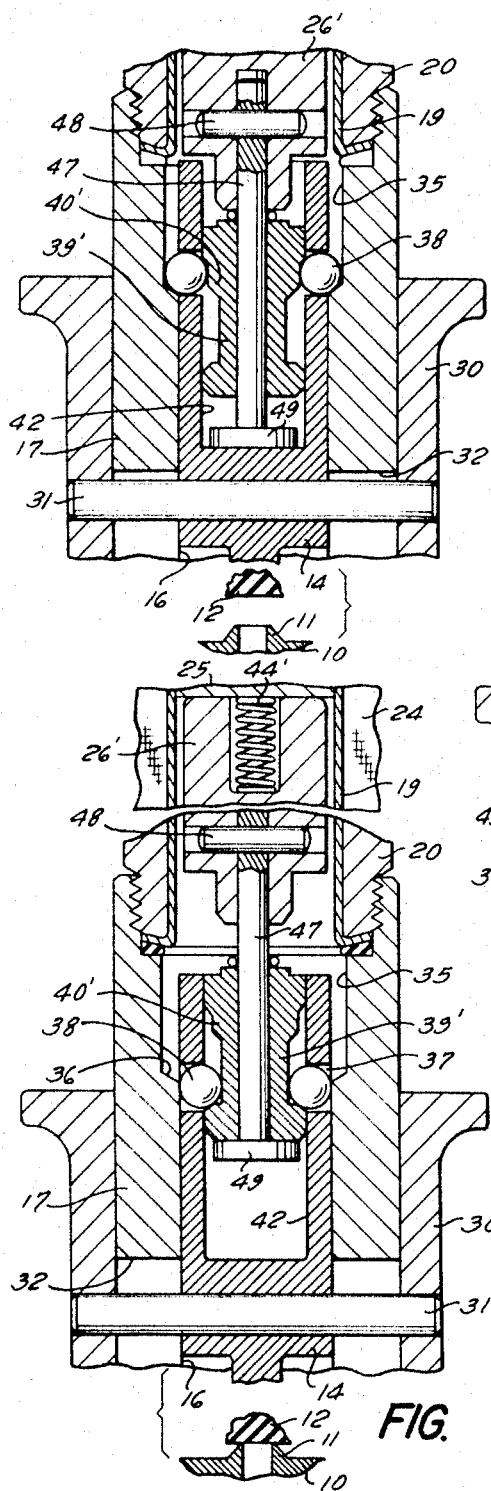

3,463,444
MANUALLY OPERABLE VALVE HAVING SOLENOID CONTROLLED RELEASABLE LATCH MECHANISM
Alan W. Churchill, Morristown, and Arthur W. Freeman, Saddle Brook, N.J., assignors to Automatic Switch Company, a corporation of New York
Filed Jan. 3, 1968, Ser. No. 695,431
Int. Cl. F16k 31/46, 31/10
U.S. Cl. 251—70        7 Claims

ABSTRACT OF THE DISCLOSURE

Valve body has seat and elongated opening slidably accommodating valve disk carrier. Inner wall of opening has recess, and carrier has transverse hole accommodating a ball. Manually slidable sleeve on exterior of valve body connected to valve disk carrier for manually opening valve. Wedging element within carrier urges ball into recess, when carrier is lifted, to latch valve open. In one embodiment, solenoid armature opposes operation of wedging element when solenoid is deenergized, and in another embodiment, armature opposes wedging element when solenoid is energized.

---

This invention relates to solenoid valves, and more particularly to such a valve having a valve member which may be releasably latched in its open condition. A valve of this general character is shown in copending application Ser. No. 455,165, filed May 12, 1965 now Patent No. 3,385,559.

In the valve disclosed in the above-mentioned copending application, a first solenoid is used to open the valve, whereupon the latch mechanism becomes operative to latch the valve open, so that the valve remains open even if the first solenoid is thereafter deenergized. A second solenoid is employed to release the latch and permit the usual closing spring to close the valve, assuming the first solenoid is deenergized.

The present invention seeks to provide a valve of similar type, but in which opening of the valve is controlled manually, and release of the latching mechanism is controlled electrically via a solenoid. Valves of this general type are known and have been used widely in situations wherein it is desired to initiate a valving operation by hand and thereafter discontinue the operation by an electrical signal, i.e., either by application of power to, or withdrawal of power from, the solenoid.

The problem with known arrangements of this type is that they involve relatively complicated combinations of leavers and latches controlled by solenoids.

It is an object of the present invention to provide a valve of the type mentioned which is much simpler to manufacture, and more compact, than arrangements heretofore known for accomplishing the same purpose. A feature of the invention resides in the enclosure of all moving parts to prevent their being adversely affected by the environment in which the valve is used.

In general, the invention includes a valve disk carrier slidable within an elongated opening fixed with respect to the valve body. A manually manipulable sleeve exterior of the valve body is slidable longitudinally with respect to the elongated opening, and is connected to the valve disk carrier so that the valve may be opened manually by moving the sleeve. A latching arrangement, adapted to maintain the valve in open condition, includes a wedging element slidable within the disk carrier, and a ball accommodated within a transverse opening in the carrier. A latching spring urges the wedging element in a direction tending to push the ball radially into a recess in the inner wall of the elongated opening, to thereby latch the carrier, and the armature of a solenoid is arranged for rendering the latching spring ineffective.

According to one embodiment of the invention, an unlatching spring, stronger than the latching spring, is provided for urging the armature and wedging element in a direction against the force of the latching spring, and the unlatching spring is overcome upon energization of the solenoid. In this case, the valve is of the type which requires that the solenoid be energized to permit latching of the valve when it is initially opened, and to permit the latch to remain effective after opening. In an alternative embodiment, the latching spring transmits its force to the wedging element via the armature, and in this case, the latching arrangement is capable of maintaining the valve open when the solenoid is deenergized. Upon energization of the solenoid, the spring is overcome, and an extension of the armature moves the wedging element and unlatches the valve.

Additional features and advantages of the invention will be apparent from the following description in which reference is made to the accompanying drawings.

In the drawings:
FIG. 1 is a longitudinal cross-section of one embodiment of this invention, only a portion of the valve body being shown, the valve being closed and the solenoid being deenergized;
FIG. 2 is a fragmentary view similar to FIG. 1, the valve being latched in open condition and the solenoid being energized;
FIG. 3 is a fragmentary longitudinal cross-section of another embodiment of this invention, the valve being closed and the solenoid being deenergized;
FIG. 4 is a fragmentary view similar to FIG. 3, the valve being latched in open condition and the solenoid being deenergized; and
FIG. 5 is a view similar to FIG. 4, the valve being closed and the solenoid being energized.

The valve chosen to illustrate this invention, and shown in FIGS. 1 and 2, comprises a valve body 10 (shown partially) having the usual inlet and outlet openings (not shown), a valve seat 11 between them, and a valve disk 12 arranged for movement toward and away from the valve seat. The disk 12 is retained in a holder 13 secured to the lower end of a valve disk carrier 14 by means of a pin 15 extending through aligned holes in the holder and carrier. The carrier 14 is slidably arranged within an elongated opening 16 in a member 17 threadably engageable at 18 with the valve body 11. At its other end, the member 17 is secured to the lower end of a solenoid core tube 19 by a nut 20.

Supported on the core tube 19 is a solenoid housing 23 enclosing a solenoid winding 24 surrounding the core tube. Tightly accommodated within the upper end of the core tube 19 is a plug nut 25, and axially slidable within the core tube is an armature 26 controlled by the solenoid 24. The lower end of the armature 26 is formed with a downwardly extending projection 27.

A compression spring 29 constantly urges the carrier 14 toward the valve seat 11, and when the valve is closed the spring 29 presses the disk 12 against the seat. A sleeve 30 surrounds, and is slidable along, the member 17, and is connected to the carrier 14 by a pin 31 passing through aligned holes in the sleeve and carrier. Elongated slots 32 are provided in the wall of member 17 through which the pin 31 passes, so that the sleeve 30 and carrier 14 may slide freely in a longitudinal direction with respect to the member 17. By manually grasping the sleeve 30 and sliding it upwardly (in FIG. 1), the valve disk carrier is moved upwardly against the force of the closing spring 29 and the disk 12 is lifted off the seat 11 to open the valve. Unless the valve is latched in its open condition, the spring 29 returns the parts to their valve closed positions shown in FIG. 1 as soon as the sleeve 30 is released.

A latching arrangement is provided for maintaining the valve open against the force of the spring 29. This arrangement is of the ball-lock type, and includes an annular recess 35 formed in the inner wall of the opening 16 in the member 17, an inclined shoulder 36 being formed at the end of the recess closest to the valve seat 11. The disk carrier 14 is provided with a transverse hole 37 so located that it can be brought into and out of registry or alignment with the recess 35 as the carrier 14 and member 17 move relative to each other. Thus, in FIG. 1 the hole 37 and recess 35 are out of alignment, whereas in FIG. 2 alignment has been established. Mounted for free movement within the transverse hole 37 is a ball 38 whose diameter is only slightly less than that of the hole 37 but greater than the depth of the recess 35. Preferably, the hole 37 extends diametrically through the carrier 14, as shown, and there is a ball 38 at each end of the hole.

Axially slidable within a bore 42 in the valve disk carrier 14 is a wedging element 29 having a central region of smallest diameter, a wedging portion 40 below the central region, and an enlarged region 41 at each end, the regions 41 serving to guide the movement of the wedging element within the bore 42. The combined radii of the wedging portion 40 and ball 38 exceeds the radius of the opening 16. Consequently, when the valve is closed, as in FIG. 1, the balls 38 are located in the path of upward movement of the wedging portion 40. However, the combined radii of the wedging portion and ball is less than the radius of the recess 35; hence, when the hole 37 and recess 35 come into alignment (FIG. 2), the wedging portion 40 can push the balls 38 into the recess 35 and move into radial alignment with the balls. A latching spring 43 located between the bottom wall of the bore 42 and the lower end of the wedging element 29 constantly urges the latter upwardly, i.e., in a direction tending to push the balls 38 radially outward. An unlatching or return spring 44, between the plug nut 25 and the upper end of the armature 26, is stronger than the latching spring 43 and constantly urges the armature downwardly.

The operation of the valve is as follows: with the solenoid 24 deenergized and the sleeve 30 released, the valve assumes the condition shown in FIG. 1, i.e., it is closed. In this condition, the unlatching spring 44 pushes the armature 26 down, and the armature in turn pushes the wedging element 39 down, against the force of the latching spring 43, so that the wedging portion 40 is out of radial alignment with the hole 37. Consequently, the balls 38 do not enter the recess 35, and the carrier 14 is free to slide with respect to the member 17. The valve may be opened manually by sliding the sleeve 30 upwardly. However, if the solenoid remains deenergized, when the sleeve 30 is moved upwardly, the carrier 14 and balls 38 also move upwardly, but the wedging element 39 remains stationary. Consequently, no latching takes place, and the valve closes, under the influence of the spring 29, as soon as the sleeve 30 is released.

However, when the solenoid 24 is enregized, the armature 26 moves up against the plug nut 25 (FIG. 2) and compresses the spring 44 thus rendering the latter ineffective for overcoming the force of latching spring 43. The latching spring is therefore free to urge the wedging element 39 upwardly and the balls outwardly, but this motion does not take place if the parts (except for the armature) are as shown in FIG. 1, since the carrier 14 restrains the balls, and hence the wedging element, from moving upwardly. However, if the sleeve 30 is now moved upwardly by hand to bring the hole 37 in the carrier 14 into registry with the recess 35, as shown in FIG. 2, the spring 43 shifts the wedging element 39 upwardly, and the wedging portion 40 pushes the balls 38 radially outward into the recess 35. As long as the wedging portion 40 remains in the plane of the balls 38, the balls are held in the recess 35. In this position, the balls 38 are operatively interposed between the carrier 14 and member 17, thereby preventing downward movement of the carrier 14 under the influence of the closing spring 29.

Should the solenoid 24 be deenergized after the latched condition shown in FIG. 2 is achieved, the unlatching spring 44 pushes the armature 26 downwardly, whereupon the armature projection 27 engages the wedging element 39 and pushes it downwardly, overcoming the force of latching spring 43. Consequently, the balls 38 are no longer held in the recess 35 by the wedging portion 40, and the balls roll inwardly along the shoulder 36. The carrier 14 and member 17 are thereby unlatched, and the spring 29 moves the valve disk 12 against the seat 11 (FIG. 1) to close the valve. Thus, it will be seen that the valve of FIGS. 1 and 2 cannot be latched in its open position, or remain latched in that position, unless the solenoid 24 is energized.

The valve of FIGS. 3–5 is similar to the valve of FIGS. 1 and 2, but functions in an inverse manner, in that it may be latched in open condition only when the solenoid 24 is deenergized and becomes unlatched when the solenoid is energized. Parts shown in FIGS. 3–5 which are identical to those in FIGS. 1 and 2 bear the same reference numerals as their corresponding parts, and those which are similar but altered in structure and/or function bear the same reference numeral, with a prime appended, as their corresponding parts.

The major differences between the embodiments of FIGS. 1 and 2 and FIGS. 3–5 reside in the unlatching arrangement. In FIGS. 3–5, the armature 26' and the wedging element 39' (which has been rotated through 180° about a horizontal axis, with respect to the element 39 of FIGS. 1 and 2) are slidably interconnected by means of a stem or extension 47 secured at its upper end to the armature 26' by a pin 48 passing through aligned holes in the armature and stem. The stem is slidably arranged within the wedging element 39', along the axis of the latter, and its lower end is formed with an enlargement or abutment 49.

In FIG. 3, the valve is shown closed and the solenoid deenergized. The compression spring 44', between the plug nut 25 and armature 26', in this case serves as a latching spring and constantly urges the armature 26' downwardly. The armature in turn urges the wedging element 39' downwardly, and the wedging portion 40' tends to push the balls 38 downwardly and outwardly. Thus, when the sleeve 30 is manually moved upwardly from its FIG. 3 position to its FIG. 4 position, bringing the hole 37 in carrier 14 into registry with the recess 35, the wedging portion pushes the balls 38 radially outward into the recess 35. During this movement, there is little or no relative movement between the stem 47 and the wedging element 39'. In this position (FIG. 4) the carrier 14 is latched against downward movement with respect to the member 17, and hence the valve is latched in open condition and will not close, even though the sleeve 30 is released, as long as the solenoid 24 remains deenergized.

When it is desired to close the valve, i.e., shift it from its FIG. 4 position to its FIG. 5 position, the solenoid 24 is energized. As shown in FIG. 5, upon energization the armature 26' moves upwardly into contact with the plug nut 25, compressing the spring 44' and rendering it ineffective to continue its latching function. In addition, as the armature 26' moves upwardly, it pulls the stem 47 with it, and the enlargement 49 on the lower end of the stem engages and lifts the wedging element 39'. As a result, the wedging portion 40' is moved out of radial alignment with the hole 37 in carrier 14, and the balls 38 roll inwardly along the shoulders 36. The carrier 14 and member 17 are thereby unlatched, and the spring 29 moves the valve disk 12 against the seat 11 (FIG. 5)

to close the valve. Thereafter, if the solenoid is deenergized, the parts assume the position shown in FIG. 3. However, as long as the solenoid remains energized, the wedging element 39' is unable to push the balls 38 into the recess 35, when the sleeve 30 is lifted, and hence the valve cannot be latched in open condition.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:
1. A valve comprising:
  (a) a valve body formed with a valve seat;
  (b) an elongated member fixed with respect to said valve body and formed with an internal elongated opening aligned with the axis of said valve seat, the inner wall of said opening having a recess;
  (c) a valve disk carrier slidably arranged within said opening, said carrier having a transverse hole so located that it comes into alignment with said recess when said carrier is moved away from said valve seat;
  (d) a ball within said hole movable radially into said recess when alignment occurs, said recess being of less depth than the ball diameter;
  (e) a wedging element slidably arranged within said disk carrier and shaped to engage said ball and push it radially outward;
  (f) a closing spring urging said carrier toward said valve seat;
  (g) a manually operable member movable with respect to said valve body;
  (h) means for transmitting the movements of said manually operable member to said valve disk carrier so as to move the latter toward and away from said valve seat; and
  (i) a solenoid and spring means cooperatively effective to control the relative positions of said wedging element and valve disk carrier,
    whereby when said manually operable member is used to move said valve disk carrier away from said valve seat said ball may be caused to intrude into said recess to maintain the valve open against the force of said closing spring, or said ball may be caused to move out of said recess to permit closing of the valve.

2. A valve as defined in claim 1 wherein said manually operable member is a sleeve surrounding, and axially slidable with respect to, said elongated member; and said transmitting means is a pin extending through the wall of said elongated member and connecting said sleeve and valve disk carrier.

3. A valve as defined in claim 1 wherein said spring means includes a latching spring urging said wedging element in a direction which tends to push said ball radially outward, and thereby causes said ball to intrude into said recess upon alignment between said hole and recess; and said solenoid having a movable armature for rendering said latching spring ineffective.

4. A valve as defined in claim 3 wherein said valve seat; elongated member; manually operable member; valve disk carrier; wedging element; solenoid; armature; and springs are all axially aligned.

5. A valve as defined in claim 3 wherein said spring means also includes an armature return spring for urging said armature and wedging member in a direction opposite to the direction in which said latching spring urges said wedging member; said return spring being rendered ineffective upon energization of said solenoid and movement of said armature; whereby upon energization of said solenoid said wedging member is free to push said ball into said recess, in response to the urgance of said latching spring, upon movement of said manually operable member to lift said valve disk carrier away from said valve seat.

6. A valve as defined in claim 3 wherein said latching spring acts on said wedging member when said solenoid is deenergized; whereby when said solenoid is deenergized said wedging member is free to push said ball into said recess upon movement of said manually operable member to lift said valve disk carrier away from said valve seat.

7. A valve as defined in claim 6 including an extension movable with said armature and slidably arranged within said wedging member; and an abutment on said extension for engaging and moving said wedging member, upon energization of said solenoid, to release said pushing force on said balls and permitting said closing spring to move said valve disk carrier toward said valve seat.

References Cited

UNITED STATES PATENTS

| | | | |
|---|---|---|---|
| 775,054 | 11/1904 | Waterman | 251—70 |
| 2,224,147 | 12/1940 | Ehlers | 251—70 |
| 2,888,025 | 5/1959 | Greenwood et al. | 251—74 XR |
| 3,033,512 | 5/1962 | Lieser | 251—74 XR |
| 3,089,507 | 5/1963 | Drake et al. | 251—68 XR |
| 3,115,330 | 12/1963 | Dollison | 251—74 XR |
| 3,174,500 | 3/1965 | Johnson et al. | 251—75 XR |
| 3,385,559 | 5/1968 | Churchill | 251—70 |
| 3,386,391 | 6/1968 | Garrett | 251—75 |

RONALD FELDBAUM, Primary Examiner